United States Patent
Blumer et al.

(10) Patent No.: US 11,269,326 B2
(45) Date of Patent: Mar. 8, 2022

(54) MONITORING AND TRACKING MODE OF OPERATION OF VEHICLES TO DETERMINE SERVICES

(71) Applicant: Mile Auto, Inc., Atlanta, GA (US)

(72) Inventors: Frederick T. Blumer, Atlanta, GA (US); Joseph R. Fuller, Mableton, GA (US)

(73) Assignee: MILE AUTO, INC., Atlanta, GA (US)

( * ) Notice: Subject to any disclaimer, the term of this patent is extended or adjusted under 35 U.S.C. 154(b) by 190 days.

(21) Appl. No.: 16/295,470

(22) Filed: Mar. 7, 2019

(65) Prior Publication Data
US 2019/0278271 A1 Sep. 12, 2019

Related U.S. Application Data
(60) Provisional application No. 62/639,685, filed on Mar. 7, 2018.

(51) Int. Cl.
*G05D 1/00* (2006.01)
*G05D 1/02* (2020.01)

(52) U.S. Cl.
CPC ......... *G05D 1/0088* (2013.01); *G05D 1/0061* (2013.01); *G05D 1/0214* (2013.01); *G05D 1/0276* (2013.01); *G05D 2201/0213* (2013.01)

(58) Field of Classification Search
CPC .................................................. G05D 1/0088
See application file for complete search history.

(56) References Cited

U.S. PATENT DOCUMENTS

| | | | |
|---|---|---|---|
| 8,352,112 B2 * | 1/2013 | Mudalige | G08G 1/164 701/24 |
| 8,473,118 B2 * | 6/2013 | Gottifredi | G01S 5/0289 701/2 |
| 9,527,515 B2 * | 12/2016 | Hunt | F01N 9/002 |
| 9,646,428 B1 * | 5/2017 | Konrardy | G08G 1/147 |
| 10,042,359 B1 * | 8/2018 | Konrardy | G08G 1/148 |
| 10,417,929 B2 * | 9/2019 | McQuade | G06Q 10/0639 |
| 10,599,155 B1 * | 3/2020 | Konrardy | B60W 60/0011 |
| 2007/0198145 A1 | 8/2007 | Norris et al. | |
| 2010/0316255 A1 * | 12/2010 | Mathony | G08G 1/09675 382/103 |
| 2012/0083960 A1 * | 4/2012 | Zhu | G05D 1/0276 701/23 |

(Continued)

OTHER PUBLICATIONS

International Search Report & Written Opinion for PCT/US2019/021182, dated May 9, 2019, pp. 1-15.

*Primary Examiner* — Alex C Dunn
(74) *Attorney, Agent, or Firm* — Thomas|Horstemeyer, LLP (57) ABSTRACT

The present disclosure is directed to systems and methods for detecting human intervention over a driving operation of a vehicle that can be operated in a semi-autonomous or an autonomous mode or at least partially in a manual mode. In any one or more aspects, the systems and methods can determine a time period or distance traveled by the vehicle during the intervention of the operation of the vehicle as compared to a time period or distance traveled by the vehicle when operating in the semi-autonomous or autonomous mode, which if desired can be used to determine risk for insurance underwriting of the vehicle.

20 Claims, 6 Drawing Sheets

(56) References Cited

U.S. PATENT DOCUMENTS

| | | | |
|---|---|---|---|
| 2014/0172290 A1* | 6/2014 | Prokhorov | G01C 21/28 |
| | | | 701/408 |
| 2014/0303827 A1* | 10/2014 | Dolgov | B60W 30/00 |
| | | | 701/23 |
| 2015/0088358 A1* | 3/2015 | Yopp | B60W 50/082 |
| | | | 701/23 |
| 2015/0178998 A1 | 6/2015 | Attard et al. | |
| 2015/0198951 A1 | 7/2015 | Thor et al. | |
| 2015/0242953 A1* | 8/2015 | Suiter | G07C 5/008 |
| | | | 705/4 |
| 2016/0116913 A1 | 4/2016 | Niles | |
| 2019/0018410 A1* | 1/2019 | Ando | B60W 30/10 |

* cited by examiner

MONITORING AND TRACKING MODE OF OPERATION OF VEHICLES TO DETERMINE SERVICES

CROSS-REFERENCE TO RELATED APPLICATION

This application claims the priority to U.S. Provisional Application No. 62/639,685, filed Mar. 7, 2018, which is entirely incorporated herein by reference.

BACKGROUND

Vehicles are increasingly incorporating various sensing mechanisms and systems to enable them to operate in a semi-autonomous or autonomous mode, meaning that the vehicle can either operate in a driving mode with little or no human intervention or with a human manually controlling one or more aspects of the driving operation, such as controlling the direction and/or speed (including acceleration and braking) of the vehicle. Such vehicles generally include the option of a manual override allowing one or more aspects of the driving operation of the vehicle to be controlled by the driver in a manual mode. This option is provided so that the driver can take control in certain situations of all or a portion of the driving, or when the driver simply wants to manually operate the driving operation of the vehicle.

There is a need, however, to monitor or determine when the driving operation of the vehicle is in a semi-autonomous or in a fully autonomous mode versus when the vehicle is operating in a manual mode. There is also a need to monitor or determine which of the one or more aspects of the driving operation of the vehicle is or has been over-ridden manually. The semi-autonomous or autonomous modes may control any one or more aspects of the steering (e.g., lane change avoidance), speed (e.g., cruise control) and braking (e.g., accident or collision avoidance braking).

Should the vehicle be involved in an event resulting in a loss, such as an accident, there could be a question whether conventional automobile insurance should apply or instead manufacturer's product liability should apply to cover the loss, or some blend thereof, depending upon the driving mode of operation of the vehicle at the time of the event, for example whether there was any intervention or over-ride of any one or more of the driving aspects of the vehicle and the degree of intervention. Additionally, information concerning the period or length of time, over what distances, and/or under what conditions the driving operation of the vehicle is in manual mode or alternatively in semi-autonomous or autonomous mode can be useful to an insurance company in rating insurance risk and determining premiums for insurance of the vehicle and driver. For the purpose of this disclosure the term "blended insurance" shall mean an insurance product combining a proportion of coverage with both products liability coverage and conventional auto insurance coverage with the proportions dependent various facts such as time, distance, nature and degree to manual instruction and/or autonomous or semi-autonomous mode.

SUMMARY

The present disclosure presents a solution to determining the driving mode of operation of a vehicle. For example, systems and methods are presented to monitor, determine, and/or track when one or more aspects of the driving operation of a vehicle are in a semi-autonomous or autonomous mode versus when it is in a partially or a fully manual mode. The present systems and methods can monitor, determine and/or track what times or periods, over what length of time, over what distances and/or under what conditions a vehicle is operating in one such mode or another such mode. Further, the present systems and methods can monitor, determine and/or track the nature or extent of human interaction with a vehicle, in particular, when the vehicle is being operated in a partially or a fully manual mode, as opposed to a semi-autonomous and/or autonomous mode, and the degree of the human interaction or intervention with a semi-autonomous or autonomous vehicle operating mode.

The present disclosure presents a solution to the challenges presented when a human overrides or intervenes with one or more aspects of the operation of a vehicle operating in a semi-autonomous or autonomous for at least a portion of the driving operation of the vehicle. The vehicle can include both private passenger and commercial vehicles. The vehicle need not be an automobile or even a land vehicle, but can also include air and marine vessels for example.

Disclosed herein are various embodiments for monitoring, determining or tracking the mode of driving operation of a semi-autonomous or autonomous vehicle that allows human intervention and operation in a partially or fully manual mode, collecting data regarding the mode of driving operation and providing improved services based on the collected data. Various embodiments of the present disclosure provide systems and methods for monitoring, determining and/or tracking various aspects of the driving mode of operation of the vehicle and data associated therewith.

Further, accurate data by monitoring various sensors and control systems located either onboard, or externally associated with, the vehicle is collected. This data can be analyzed in accordance with various embodiments described herein to determine times, durations, locations, conditions, nature, extent, degree, and/or events when one or more aspects of the driving operation of the vehicle are in autonomous or semi-autonomous modes and/or in partially or fully manual mode (for example, when the driver of the vehicle intervenes with or takes over one or more aspects of the operation of the direction and/or speed of the vehicle from an autonomous mode) and/or the degree of human intervention. In various embodiments, this data is used to underwrite or personalize insurance coverage and other services on the vehicle. In various aspects, the data collected can be used for "micro-risk" determination of the insurance coverage or underwriting.

In an embodiment a system for detecting human intervention over a driving operation of a vehicle is provided. The system can comprise: at least one vehicle sensor; at least one vehicle control system; at least one processor in communication with the at least one vehicle sensor and the at least one vehicle control system; at least one memory storing a plurality of instructions, which when executed by the at least one processor, cause the at least one processor to: collect vehicle driving operation data from the at least one vehicle sensor; store the collected vehicle driving operation data in a vehicle data store along with an indication whether the vehicle is at least operating in a first semi-autonomous or autonomous mode; and transmit the collected data from the vehicle data store to a remote data store.

In any one or more aspects, the system can comprise at least one computing device in communication with the remote data store. The plurality of instructions can cause the at least one processor to determine that the vehicle is not operating in the first semi-autonomous or autonomous mode and store the vehicle operation data in the vehicle data store along with an indication that the vehicle is not operating in the first semi-autonomous or autonomous mode. The vehicle driving operation data can include data concerning a duration of operation while the vehicle is not in semi-autonomous or autonomous mode. The vehicle driving operation data can include data regarding human intervention with a driving operating system of the vehicle. The driving operating system can be semi-autonomous or an autonomous driving or operating system. The vehicle driving operation data can include data regarding the initiation and termination of a human intervention with a driving operating system of the vehicle. The vehicle driving operation data can include one or more of the time of day of the initiation and termination of the human intervention, a time duration from the time of initiation of the human intervention to the time of termination of the human intervention, or the distance traveled by the vehicle from the time of initiation of the human intervention to the time of termination of the human intervention. The driving operating system of the vehicle can be selected from the group consisting of systems for the steering, direction, acceleration, speed, braking, cruise control, accident or collision avoidance, lane departure, seat belts, and any combination thereof. The vehicle driving operation data can include data regarding one or more of a vehicle location or area of travel, a road condition, a road area speed limit, a weather report or condition, or road area event. The vehicle can be selected from the group consisting of automobiles, trucks, motorcycles, scooters, motorized marine vessels, aircraft, drones and flying vehicles, permitting human operation at least in part. The at least one computing device can comprise a memory storing instructions, which when executed by the at least one computing device, cause the at least one computing device to determine a ratio of duration the vehicle was operated in the first semi-autonomous or autonomous mode to a total duration during which the vehicle was operated.

In an embodiment, a method of detecting human intervention over a driving operation of a vehicle during a given period of time or over a given distance traveled by the vehicle is provided. The vehicle can include a vehicle monitoring system. The method can comprise: obtaining data from the vehicle monitoring system; determining an occurrence of a manual intervention event over a driving operation of the vehicle; determining a duration, nature and/or extent of the manual intervention event within the given period of time or over the given distance traveled by the vehicle; and determining a duration, nature and/or extent the driving of operation of the vehicle without manual intervention within the given period of time or over the given distance traveled by the vehicle.

In any one or more aspects of the method, the duration, nature and/or extent of the manual intervention event can be compared to the duration, nature and/or extent of the driving operation of the vehicle without manual intervention. The method can include determining insurance coverage based thereon. The data from the vehicle monitoring system can be vehicle driving operation data that can include data regarding manual intervention with a driving operating system of the vehicle. The vehicle driving operation data can include data regarding the initiation and termination of a human intervention with a driving operating system of the vehicle. The driving operating system can be a semi-autonomous or an autonomous vehicle driving or operating system. The driving operation data can include one or more of the time of day of the initiation and termination of the manual intervention, a time duration from the time of initiation of the manual intervention to the time of termination of the manual intervention, or the distance traveled by the vehicle from the time of initiation of the manual intervention to the time of termination of the manual intervention. The driving operating system of the vehicle can be selected from the group consisting of systems for the steering, direction, acceleration, speed, braking, cruise control, accident or collision avoidance, lane departure, seat belts, and any combination thereof. The vehicle driving operation data can include data regarding one or more of a vehicle location or area of travel, a road condition, a road area speed limit, a weather report or condition, or road area event. The vehicle can be selected from the group consisting of automobiles, trucks, motorcycles, scooters, motorized marine vessels, aircraft, drones and flying vehicles, permitting human operation at least in part.

In an embodiment, a computer readable medium embodying a program that, when executed in at least one computing device, causes the at least one computing device to at least determine a human intervention over a driving operation of a vehicle during a given period of time or over a given distance traveled by the vehicle, the vehicle including a vehicle monitoring system is provided. The computing device can: obtain data from the vehicle monitoring system; determine an occurrence of a manual intervention event over a driving operation of the vehicle; determine a duration, nature and/or extent of the manual intervention event within the given period of time or over the given distance traveled by the vehicle; and determine a duration, nature and/or extent the driving of operation of the vehicle without manual intervention within the given period of time or over the given distance traveled by the vehicle.

In any one or more aspects of the computer readable medium, the duration, nature and/or extent of the manual intervention event can be compared to the duration, nature and/or extent of the driving operation of the vehicle without manual intervention. The computer device can determine insurance coverage based thereon. The data from the vehicle monitoring system can be vehicle driving operation data that includes data regarding manual intervention with a driving operating system of the vehicle. The vehicle driving operation data can include data regarding the initiation and termination of a manual intervention with a driving operating system of the vehicle. The driving operating system can be a semi-autonomous or an autonomous vehicle driving or operating system. The vehicle driving operation data can include one or more of the time of day of the initiation and termination of the manual intervention, a time duration from the time of initiation of the manual intervention to the time of termination of the manual intervention, or the distance traveled by the vehicle from the time of initiation of the manual intervention to the time of termination of the manual intervention. The driving operating system of the vehicle can be selected from the group consisting of systems for the steering, direction, acceleration, speed, braking, cruise control, accident or collision avoidance, lane departure, seat belts, and any combination thereof. The vehicle driving operation data can include data regarding one or more of a vehicle location or area of travel, a road condition, a road area speed limit, a weather report or condition, or road area event. The vehicle can be selected from the group consisting of automobiles, trucks, motorcycles, scooters, motorized marine vessels, aircraft, drones and flying vehicles, permitting human operation at least in part.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Many vehicles now offer or provide semi-autonomous and/or autonomous modes for controlling the driving operation of the vehicle. Autonomous and semi-autonomous modes of operation mean that computerized systems of the vehicle control certain driving operations of the vehicle such as steering or direction, acceleration or speed, and braking of the vehicle without human intervention or interaction. Vehicles that provide semi-autonomous and/or fully autonomous modes of operation typically also allow human intervention allowing for manual override of the semi-autonomous and/or autonomous modes of operation, or i.e., a partially or fully manual mode for controlling the driving operation of the vehicle.

However, since semi-autonomous and autonomous modes of a vehicle can be manually overridden by the passenger/driver there is a need to monitor and track when one or more aspects of the driving operation of the vehicle are in semi-autonomous and/or autonomous modes versus when it is in partially or fully manual mode. There can also be a need to determine what periods and length of time, over what distances and/or under what conditions the vehicle is operating in one mode or another and the nature or extent of the interaction, in particular, when the vehicle is being operated in partially or fully manual mode, and the degree of intervention.

Until recently automobiles could only be driven in a manual mode, meaning that a person or driver was required to manually operate the vehicle by controlling its direction, steering, acceleration, speed, braking, etc. An auto insurance industry developed around a concept of providing financial support and protection in the event of a loss caused by or related to a vehicle, such as an automobile operated in such manual mode. Insurance is mandated under State law throughout the United States, and covers losses ranging from vehicle damage to bodily injury to loss resulting from theft, among others.

Now with the advent and development of semi-autonomous and autonomous vehicle technologies, the insurance industry is confronted with numerous challenges to the traditional concept of providing financial support and protection in the event of a loss related to a vehicle when one or more aspects of the vehicle are not being driven in a manual mode. This presents challenges to traditional theories, methodologies, and algorithms for providing insurance coverage for a vehicle or driver.

For fully autonomous vehicles, some stakeholders contemplate that insurance provided by the driver or vehicle owner may no longer be needed, as the responsibility for risk will be borne by automakers, software suppliers, and manufacturers of the components of the vehicle as opposed to conventional auto insurance. Product liability concepts may govern the provision and application of insurance coverage for fully autonomous vehicles. By a fully autonomous vehicle, also known as a driverless vehicle, self-driving vehicle or a robotic vehicle, is meant a vehicle that is capable of sensing its environment and navigating without human input. A semi-autonomous vehicle is one that cannot be operated driverlessly, but that has controls for operating one or more driving aspects, such as one or more of speed cruise control, accident or collision braking and lane departure prevention.

There exist challenges, however, in the case of a semi-autonomous vehicle and an autonomous vehicle that includes the capability or allows the opportunity for a passenger or driver within the vehicle to override one or more aspects of the driving operation of the vehicle and to thereafter operate certain aspects or functions of the vehicle manually such that the driver then has the ability to intervene with one or more aspects of the driving operation and to control the driving operation, such as the direction or steering, acceleration, speed, braking, etc., of the vehicle instead of the semi-autonomous or autonomous mode of the vehicle.

Modern vehicles include a vast array of telematics systems for controlling and for providing various systems data and autonomous functionality for the operation of the vehicle. The telematics systems can be part of a neuro-network or brain or artificial intelligence behind the operation of the vehicle. There are numerous sensors, electronic control units (ECU's), and various processing units or computers throughout the vehicles. The telematics systems and other electrical networks can monitor and control various aspects of vehicle functions and can monitor performance of the various systems in and driving operations of the vehicle. The monitoring capabilities of present vehicles can include vehicle systems (including electrical, mechanical, and environmental systems, etc. These systems include systems for controlling the speed of an automobile (such as cruise control systems), systems to control traction and stability of the automobile (such as traction control systems), and systems to control breaking of a vehicle (such as collision avoidance systems which can activate breaking of a vehicle to avoid colliding with a vehicle in front of it), among others These monitoring capabilities can also monitor human interaction and intervention with such vehicle systems including interaction with steering, braking, acceleration and speed, seat-belt usage, etc. These vehicle technologies can detect or sense when a human operator intervenes or overrides the system within the vehicle. For example, when an adaptive cruise control system begins to slow a vehicle due to congestion ahead, the driver can override the system causing the vehicle to maintain speed, accelerate and/or to swerve around traffic (change direction). The systems can detect, and record, when such driver overrides occur, as well the length of time or period of override, the distance covered during the override and the nature and extent (or degree) of such override. Thus, for example such systems can detect and record when a person is controlling or operating the steering wheel, gas pedal, and/or brakes (i.e., brake pedal) of a vehicle and the duration and nature and extent of interaction or intervention.

Because original equipment manufacturers (OEMs) anticipate offering products liability insurance protection for the parts, components systems and software they provide, certain losses related to vehicle operation are expected to be covered by product liability insurance without the need for a driver/owner to have a separate individual conventional auto insurance policy. However, when human intervention or override is possible impacting the driving or other operation of an autonomous vehicle, determining and segregating the risk and liability between operation in a semi-autonomous or autonomous mode as opposed to manual mode may require an apportionment of risk between the semi-autonomous or autonomous operation and the manual operation of the vehicle. In various aspects, the present disclosure provides a solution to this problem. In various aspects, the present disclosure allows determination of "micro-risk" impact and apportionment.

Figure 1:
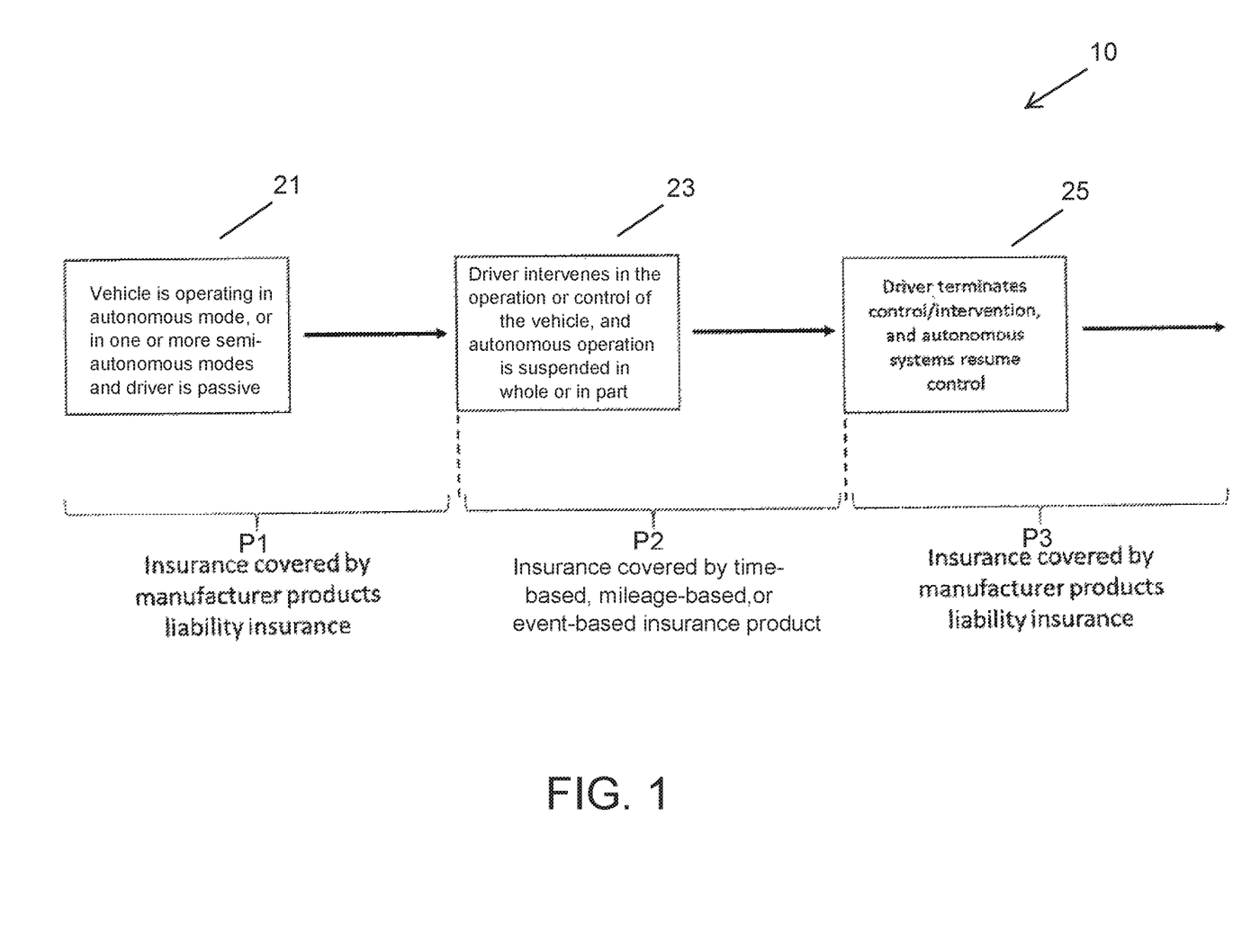
FIG. 1 is a diagram illustrating an example of an override of an autonomous mode of operation of a vehicle to a manual mode of operation and subsequent termination of the manual mode of operation returning operation of the vehicle back to the autonomous mode.
Figure 2:
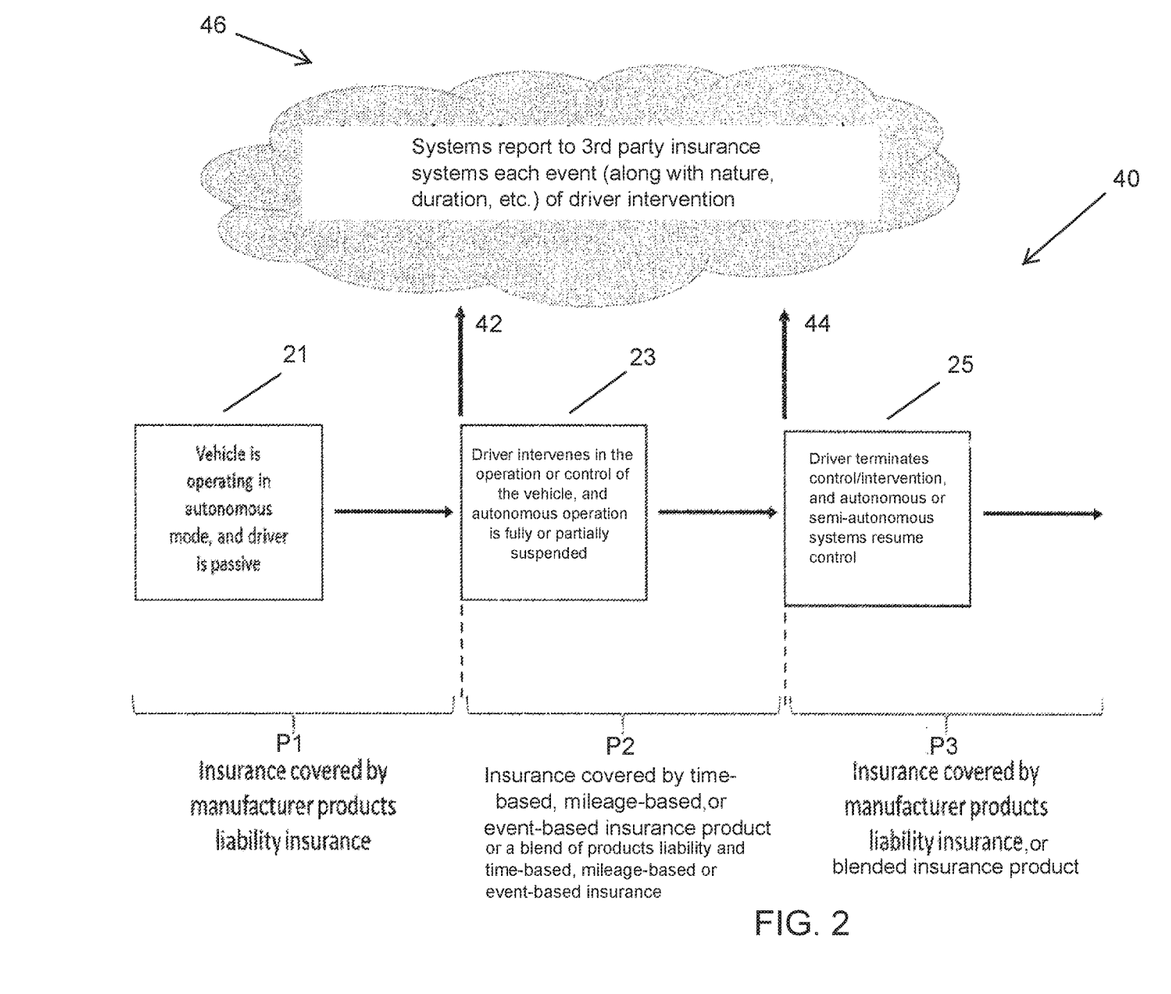
FIG. 2 is a diagram illustrating the example of FIG. 1 further incorporating communication of monitoring information related to the transition from autonomous mode or semi-autonomous mode to manual mode of operation of a vehicle and vice versa, along with data concerning the manual mode of operation such as the nature of intervention, the degree or extent of manual interaction, the period or duration of operation or distance travelled while under manual or semi-autonomous or autonomous mode.

FIGS. 1 and 2 illustrate an example of the present disclosure in which a vehicle begins driving operation in an autonomous mode 21 for a period (e.g., time and/or distance, P1). During this period, the person or driver within the cabin of the vehicle is passive meaning that the person or driver is not making any effort or taking any action to intervene with or override the autonomous driving mode or interact with the vehicle to control the driving operation of the vehicle, such as the direction or steering, acceleration or speed, or braking of the vehicle. During this period P1, it is anticipated that insurance coverage provided by manufacturer products liability insurance would apply in the event of a loss involving the vehicle, such as an automobile accident.

At some later point a driver may decide to override or take control over one or more aspects of the driving operation of the vehicle. This may happen for any one or a number of reasons. For example, a driver may decide to alter the direction of the vehicle (such as the taking control of the steering wheel), the speed of the vehicle (for example, accelerate using the gas pedal or decelerate (brake) the vehicle), or to take an alternate route to a final destination, at which time the autonomous mode of operation the vehicle is terminated or overridden and one or more aspects of the vehicle are now being controlled or operated in a manual mode 23. The manual mode of operation can occur during or over a second period of time or distance P2. During the period P2 of driving operation of the vehicle in manual mode, it is anticipated that insurance coverage provided by the owner's or driver's individual automobile insurance policy in whole or in part would apply in the event of a loss involving the vehicle (for example, depending upon the model(s) intervened and the nature and extent of intervention). Apportionment of risk may be applied depending upon the extent and nature of intervention (e.g., light versus aggressive braking or acceleration. At some later point in time, the driver may decide to terminate manual control and/or terminate the intervention of the autonomous mode of the driving operation of the vehicle and allow the autonomous or semi-autonomous mode to resume 25 driving control of the vehicle over a third period, P3. During this third period, P3, it is anticipated that insurance covered by the manufacturer products liability insurance will again apply as opposed to the driver/owner's individual insurance policy.

In any one or more aspects herein, the respective periods of driving operation in autonomous mode versus manual mode can be determined or based on either the time or duration of operation during the respective periods or the mileage or distance covered during the respective periods as well as the nature and/or extent of such manual intervention.

Upon the occurrence of such driver intervention or override of an autonomous or semi-autonomous mode of driving operation of the vehicle, data such as the time, duration, and/or distance travelled during the period of intervention (for example, between initiation and termination of the intervention) as well as the nature and extent of such intervention, can be tracked and reported 42, 44, for example, to a vehicle data system described further herein such as a data system of the insurer 46 underwriting the driver or vehicle owner's separate individual vehicle insurance policy, as illustrated in FIG. 2. The data reported to the data system of the insurer can be obtained from a vehicle monitoring system or aftermarket telematics system installed on the vehicle to monitor one or more vehicle systems. For example, such vehicle driving operation data can be collected and outputted, for example the insurance company underwriting the vehicle's insurance. Such vehicle monitoring systems can provide the output or data concerning the respective periods of driving operation along with the nature and extent of the manual intervention of the one or more systems. The insurance underwriter can then rate the risk and/or determine an on-demand premium for the driver/owner's individual vehicle policy based on the period of operation of the vehicle in manual mode and in turn bill the driver/owner for such period(s) of operation of the vehicle in manual driving mode and during which the intervention or override of the autonomous or semi-autonomous driving mode takes place, or in the case the intervention is not a complete intervention, apportion the risk depending upon the modes intervened and the extent and nature of the intervention.

In any one or more aspects, systems onboard a vehicle can sense when the one or more autonomous or semi-autonomous modes of driving operation of the vehicle are terminated or overridden (i.e., when human intervention of a system is initiated and when the intervention is terminated) and also track various driving conditions, such as time of day (i.e., whether the manual mode of operation is during rush hour or late at night, or otherwise at a time of higher risk), the speed(s) of operation of the vehicle, road conditions such as road speed limits and/or road congestion (through cooperation with, for example, road or traffic information provided by a navigation system such as Google Maps), and weather conditions such as a rain condition through for example one or more sensors associated with the windshield and windshield wipers that help control automatic operation of the windshield wipers in the event of rain.

Thus, the various embodiments described herein provide systems and methods for determining whether the driving operation of a vehicle is in a semi-autonomous or an autonomous mode or in a manual or semi-manual mode and over what period(s) of time or distance(s). Further, the determination can be output or communicated to an insurance company or underwriter and used by the company or underwriter to provide a customized insurance coverage to the driver in the event of a loss related to or associated with the vehicle. The customized insurance coverage can be micro-risk-based depending upon the nature and extent of mode intervention. Reference will now be made in detail to the description of the embodiments as illustrated in the drawings, wherein like reference numbers indicate like parts throughout the several views.

Figure 3:
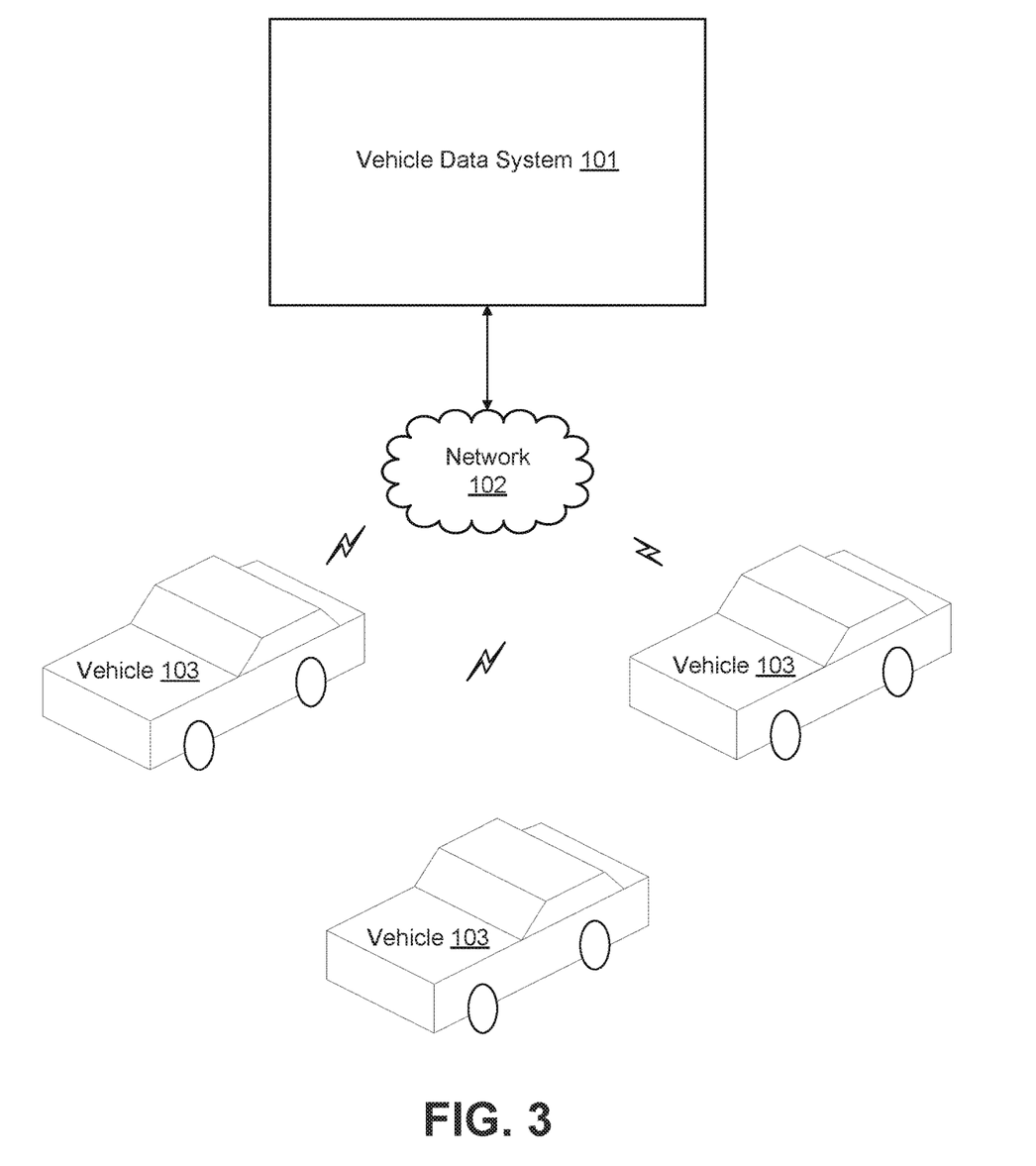
FIG. 3 is a graphical representation illustrating an example of a network for implementing the example of FIG. 2 in accordance with various embodiments of the present disclosure.

FIG. 3 is a graphical representation illustrating an example of various components in an autonomous vehicle in communication with a vehicle data system. Vehicle Data System 101 communicates over Network 102 to various Vehicles 103. Vehicle Data System 101 receives vehicle data from one or more of Vehicles 103. Network 102 can be onboard or external the vehicle. Vehicle Data System 101 can be a data system of a vehicle insurer or underwriter as well as a data system of a vehicle manufacturer and/or a data system of an after-market telematics supplier or manufacturer. Vehicle data can be data associated with or related to when, how, and over what period(s) the vehicle is in a semi-autonomous or autonomous mode or in manual mode of driving operation. Vehicle Data System 101 can also receive or collect data concerning road and environmental conditions during semi-autonomous, autonomous and/or manual modes of driving operation of the vehicle. In various embodiments, Vehicle Data System 101 is a computing environment. Vehicles 103 include vehicles such as passenger cars, taxis, ridesharing cars, buses, trucks, etc. Vehicles 103 include those that can drive in semi-autonomous or autonomous modes.

Figure 4:
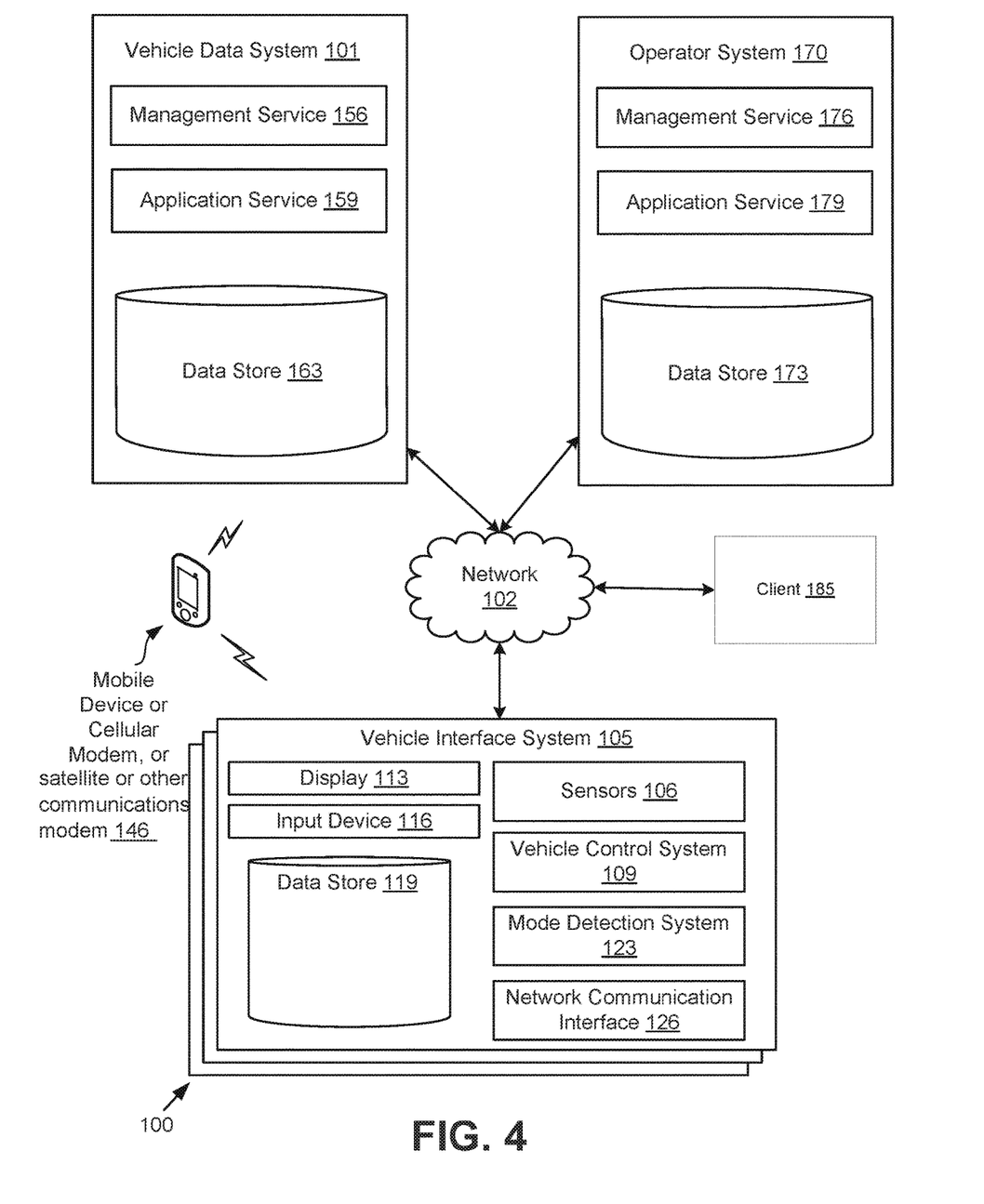
FIG. 4 is a graphical representation of an example of a system for implementing the examples of FIGS. 2 and 3, in accordance with various embodiments of the present disclosure.

FIG. 4 is a graphical representation illustrating an example of various components in an autonomous vehicle in communication with a Vehicle Data System 101, such as illustrated in FIG. 3. Vehicle 103 includes a Vehicle Interface System 105. Vehicle Interface System 105 can include various one or more Sensors 106 and one or more Vehicle Control Systems 109. Vehicle Interface System 105 can also include a one or more Displays 113, one or more Input Devices 116 and one or more Data Stores 119. Vehicle Interface System 105 can be implemented as one or more computing environments, a special purpose computing device, or special embedded microprocessor circuitry.

Vehicle Interface System 105 can communicate via Network 102 to one or more Vehicle Data Systems 101. In various embodiments, Vehicle Interface System 105 communicates with Vehicle Data System 101, for example, via a Mobile Device 146 or via satellite, embedded cellular modem, wifi, Bluetooth, Zigbee, or other data transmission system. Vehicle Data System 101 includes Management Service 156, Application Service 159 and Data Store 163. Vehicle Data System 101 can be implemented as one or more computing environments, a server, a virtualized server, a cloud computing server, or other forms of implementing computer servers. Vehicle Data System 101 can be external to or embedded in vehicle(s) 103.

Vehicle Interface System 105 interfaces with various components of various vehicle systems, such as vehicle drive systems, vehicle safety systems, infotainment systems, etc. The vehicle systems can include vehicle steering and lane marking or warning and departure systems, automatic braking systems (including those that automatically brake a vehicle upon detection of a slow or stopped vehicle ahead (i.e., a collision avoidance braking system), acceleration, accelerators, cruise control systems, electronic stability control, and the like.

Sensors 106 can include cameras, accelerometers, radar sensors, ultrasonic sensors, IR sensors, gyroscopes, GPS, touch sensors, etc., that collect various operational data of the vehicle, including those that collect operational data for control and operation of the various vehicle systems and driver interaction or intervention therewith. Vehicle operational data includes speed, steering, acceleration, current fuel economy, torque, RPM, G-force, compass heading, lane departure, tilt angle, gross weight, tire pressure, status of various components of the vehicle (headlights, wipers, doors, seatbelt, airbags, etc.), location of vehicle, driver that is operating vehicle, outside temperature, GPS status (e.g., providing directions, rerouting, number of times rerouting, etc.).

Any one or more Vehicle Control Systems 109 operate various vehicle controls of various vehicle systems, such as, steering, braking, acceleration, collision detection and mitigation system(s), adaptive cruise control, lane assist control, navigation, autonomous mode engage, seatbelt pretensioner, electronic stability control, etc. Mode Detection System 123 continuously monitors the Vehicle Control System 109 to determine and monitor whether any of the Vehicle Control System(s) 109 are operational (engaged, idle, etc.) or have been overridden by the driver. Mode Detection System 123 can monitor driver interaction with any one or more of the various control devices of the vehicle, such as the gas pedal, brake pedal, steering wheel, turn signal stalk, etc.

As non-limiting examples, any one or more of Sensors 106 can be used and programmed in conjunction any one or more of the Vehicle Control Systems 109 to monitor, track and/or determine human intervention with any of the Vehicle Control Systems 109. Any one or more of Sensors 106 can be used to sense and determine both initiation and termination of human intervention with any one or more of the Vehicle Control Systems 109. For example, sensors in the steering, breaking, cruise control, lane assist control, navigation, etc. systems can be used to detect both initiation and termination of human intervention with any one or more of such systems. A system clock or the clock in the automobile can be used to or monitor the time of day of initiation and termination of intervention and/or duration of the intervention. For example, data (also referred to herein as monitoring data) from a Sensor 106 can be time stamped with the time (including the time of day, and also the day, month and year, if desired) a Senor 106 senses an intervention with any one or more of the Vehicle Control Systems. Data from the odometer and/or GPS systems in the vehicle can be coupled or combined with the Senor 106 data and used to determine a distance of travel between initiation and termination of an intervention. Such data also referred to herein as vehicle driving operation data, can be collected and stored as well as communicated, for example as described below.

Data Store 119 stores data, such as vehicle operation and/or monitoring data and such as data corresponding to initiation and termination of an intervention with a Vehicle Control System 109, from Sensors 106, Vehicle Control System 109 and Mode Detection System. Vehicle data stored in Data Store 119 is time stamped in various embodiments, i.e., stored along with a timestamp reflecting the time the vehicle tracking data (such as time of initiation and termination of an intervention) was generated by the source and/or received in Data Store 119. Vehicle data in Data Store 119 can be communicated to Vehicle Data System 101 via Network 102 and/or Mobile Device 146. In various embodiments, at regular predefined or user-defined intervals, such as every 1, 2, 3, 4, 5 minutes, every hour, every trip, upon the occurrence of a loss event every day, etc., vehicle monitoring data stored in Data Store 119 is communicated via Network to Vehicle Data System 101.

In any one or more embodiments, vehicle data stored in Data Store 119 is automatically communicated on engagement or disengagement of autonomous operating mode of the vehicle during operation, at the termination of a trip, periodically, upon the occurrence of an event, etc. In any one or more of the embodiments herein, Vehicle Communication Interface 126 includes a wireless communication module, such as Wifi (802.11) or mobile data communication module (3G/LTE, GSM, etc.) and communicates vehicle operational and/or monitoring data to Vehicle Data System when a suitable connection is available. For example, Vehicle Communication Interface 126 can communicate data in Data Store 119 on an hourly or a daily basis, when the vehicle is parked in the home of the driver and within range of the home wifi network. In other examples, Vehicle Communication Interface 126 can communicate data in Data Store 119 on a real time basis via a mobile data communication module.

In any one or more other embodiments, Network Communication Interface 126 includes a short range communication module such as Bluetooth, NFC, DSRC, Zigbee, Z-wave, IR communicates to Vehicle Data System 101 via an intermediary device. For example, the driver of the vehicle may have a central hub or similar device located in the driver's home. When the vehicle is parked, Network Communication Interface 126 detects that it is in range of the central hub and communicates data stored in Data Store 119 to the central hub to be then communication to Vehicle Data System 101.

In any one or more other embodiments, Network Communication Interface 126 can include means to download data from Data Store 119. The download means can be a physical means such as a USB connector or a conventional wireless connection as described above. Another example of a physical connector may be one that is including in the charging interface of an electric vehicle. So when the vehicle is being charged via a charging cable connected to the vehicle, the interface may include a data communication channel to allow for data in Data Store 119 to be communicated to a home or commercial hub which may then communicate to Vehicle Data System 101 over the internet or a private network.

Each vehicle can communicate the data (including data corresponding to an intervention with a Vehicle Control System 109) stored in Data Store 119 to Vehicle Data System 101. In addition to the data stored in Data Store 119, each vehicle can also communicate a unique identifier or other identification information to Vehicle Data System 101 in order that Vehicle Data System 101 can distinguish data it receives from multiple vehicles. This identification information along with vehicle monitoring data communicated by the vehicle is stored in Data Store 163 of Vehicle Data System 101.

Vehicle Data System 101 can also include Management Service 156 and Application Service 159. Management Service 156 can provide functionality such as data storage and integrity management in Data Store 163, logic or programming for retrieving or receiving data via Network 102 from Vehicle Interface System 105. Application Service 159 provides functionality such as an application for a driver to view various data collected from their vehicle, such as, the trips taken, distance travelled, various data gathered from Sensors 106 and Vehicle Control System 109. Another example of functionality provided by Application Service 159 is performing machine learning on the vehicle data to provide improvement in various aspects of semi-autonomous or autonomous modes of the vehicles.

Also included in any one or more embodiments is Operator System 170 that communicates with Vehicle Data System 101 via Network 102. In various embodiments, Operator System is implemented in the same computing environment as Vehicle Data System 101 and may not need Network 102 to communicate with Vehicle Data System 101. In various embodiments, Operator System 170 may communicate with Vehicle Data System 101 via a different network than Network 102, such as a private LAN, a VPN link, etc. In various embodiments, Operator System 170 may communicate with Vehicle Data System 101 directly via a physical or wireless connection, such as a USB interface, a custom wired interface, a Bluetooth connection, etc.

Operator System 170 can include Data Store 173, Management Service 176, and Application Service 179. In any one or more embodiments, Management Service 176 provides functionality such as data storage and integrity management in Data Store 173, logic or programming for retrieving or receiving data via Network 102 from Vehicle Data System 101. Application Service 179 can provide functionality such as determining insurance premiums based on data retrieved or received from Vehicle Data System 101. This can be presented in a user interface, such as a web application that can be accessed by one or more client computing devices over a network such as Network 102.

Figure 5:
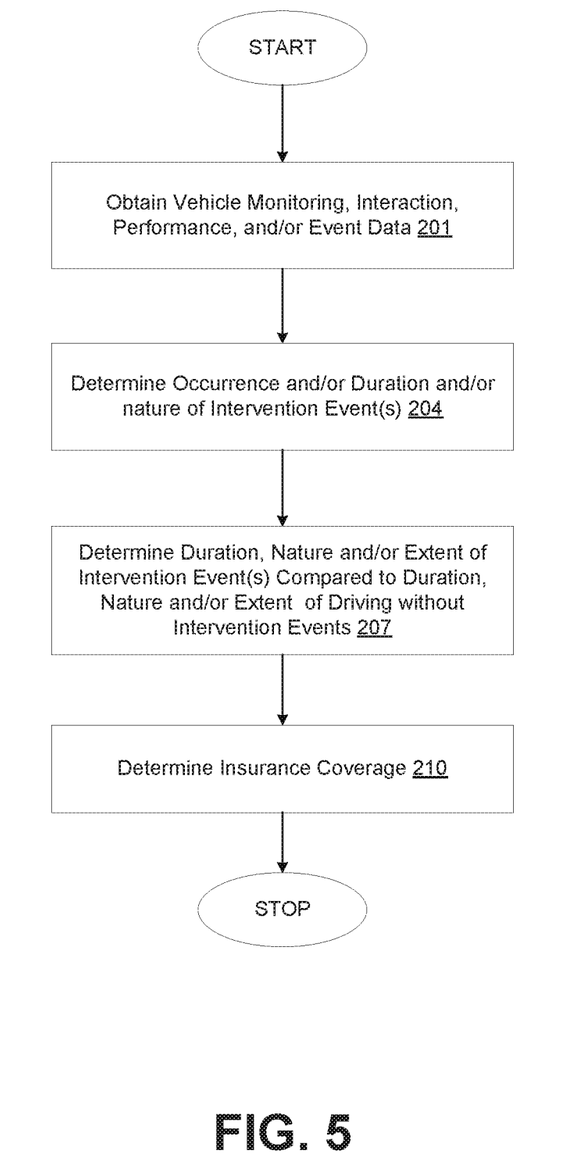
FIG. 5 is a flowchart illustrating one example of functionality implemented as portions of the operator system executed in a computing environment in the networked environment of FIGS. 2 and 3 according to various embodiments of the present disclosure.

Referring next to FIG. 5, shown is a flow chart illustrating one example of functionality implemented as portions of the operator system executed in a computing environment in the networked environment of FIG. 4 according to various embodiments of the present disclosure. It is understood that the flowchart of FIG. 5 provides merely an example of the many different types of functional arrangements that may be employed to implement the operation of the portion of the Operator System 170 as described herein. As an alternative, the flowchart of FIG. 5 can be viewed as depicting an example of steps of a method implemented in the computing environment 500 (FIG. 6) according to one or more embodiments.

Beginning with box 201, Operator System 170 retrieves vehicle data such as operational and/or monitoring data as described herein (for example, including data relating to the initiation and termination of a human intervention with a Vehicle Control System 109). The vehicle monitoring data can include data concerning human interaction and intervention with vehicle operating systems and modes, performance of the systems, and/or events from Data Store 173. In various embodiments, vehicle data is mirrored between Data Store 173 and Data Store 163. In various embodiments, vehicle data is retrieved at regular predetermined or user-defined schedules or loss events from Data Store 163 and stored in Data Store 173. In various embodiments, Operator System 170 can retrieve data from Data Store 163 at box 201. In various embodiments, vehicle data is retrieved for an individual vehicle. In various embodiments, vehicle tracking data is retrieved for a quantity of vehicles. At box 204, the vehicle data is analyzed to determine occurrence nature and/or extent of interaction or intervention events.

In any one or more embodiments, Operator System 170 analyzes vehicle data to determine the occurrence, nature and/or extent of certain events which indicate an intervention and/or duration of the intervention in the operation of the vehicle in autonomous mode or manual mode. Examples of intervention events include driver engaging brakes, accelerating, operating or controlling the steering wheel, or any other action by the driver that suspends or intervenes the vehicle's semi-autonomous or autonomous driving mode and can include the period of time and/or the distance traveled during an intervention. Operator System 170 uses various criteria to determine the occurrence nature and/or extent duration of intervention events. These criteria can weigh the various events differently to determine the occurrence nature and/or extent duration of intervention events. In various embodiments, Operator System can use different intervention events for each vehicle. In various embodiments, intervention events are detected and determined by Vehicle Interface System 105. These are then stored along with vehicle monitoring data in Data Store 119 and/or Data Store 163.

Once Operator System 170 determines the occurrence of one or more intervention events, operation moves to block 207, where Operator System 170 determines the duration of operation of the vehicle in semi-autonomous or autonomous modes compared to the duration nature, of and/or extent operation of the vehicle in override or manual mode, i.e., during the occurrence of intervention events. For example, a driver might decide to take over the operation of a vehicle in autonomous mode when traffic might indicate that the vehicle should slow to 45 mph, or take an alternate route. The driver might decide to weave through traffic at 55 mph and/or pursue a route not recommended by the autonomous system. Upon the occurrence of such driver intervention event, the time and/or mileage or distance traveled during the intervention event is determined by Operator System 170 along with the nature and extent of the intervention. In various embodiments, the time and/or mileage is also recorded by Vehicle Interface System 105 and stored in Data Store 119 and/or Data Store 163. The determination from block 207 can be output in any one or more forms. For example, it can be output to a display to one or more of the data stores, and/or it can be communicated to a system, network or computer apart from the vehicle (such as a network maintained by the insurance company or underwriter providing insurance coverage for the vehicle).

At block 210, Operator System 170 can determine insurance coverage for the vehicle, based on the aforementioned determination from block 207. In various embodiments, Operator System 170 determines insurance premiums for an autonomous vehicle by comparing the total time and/or distance and/or after factors during a predefined period, such as a calendar month, the vehicle was driven in semi-autonomous or autonomous mode versus the total time and/or distance the vehicle was driven in that period or driven in manual mode, along with the nature and/or extent of the manual intervention.

In any one or more embodiments, Operator System 170 weighs various factors, such as time driven, distance driven, driving behavior (as monitored by various of the systems and sensors), time of day of intervention events, nature of intervention events, and location of intervention events (highway, surface streets, etc.) to determine insurance premiums for the vehicle. For example, Operator System 170 can calculate an insurance premium, in accordance with various embodiments, based only on the time and/or distance the vehicle is being driven in a manual mode. In various embodiments, insurance premiums can be calculated based on weighing the time or distance driven in semi-autonomous or autonomous modes differently than the weighting assigned to the time or distance driving in manual mode. Likewise, insurance premiums can be adjusted depending upon the nature and extent of the intervention events.

Figure 6:
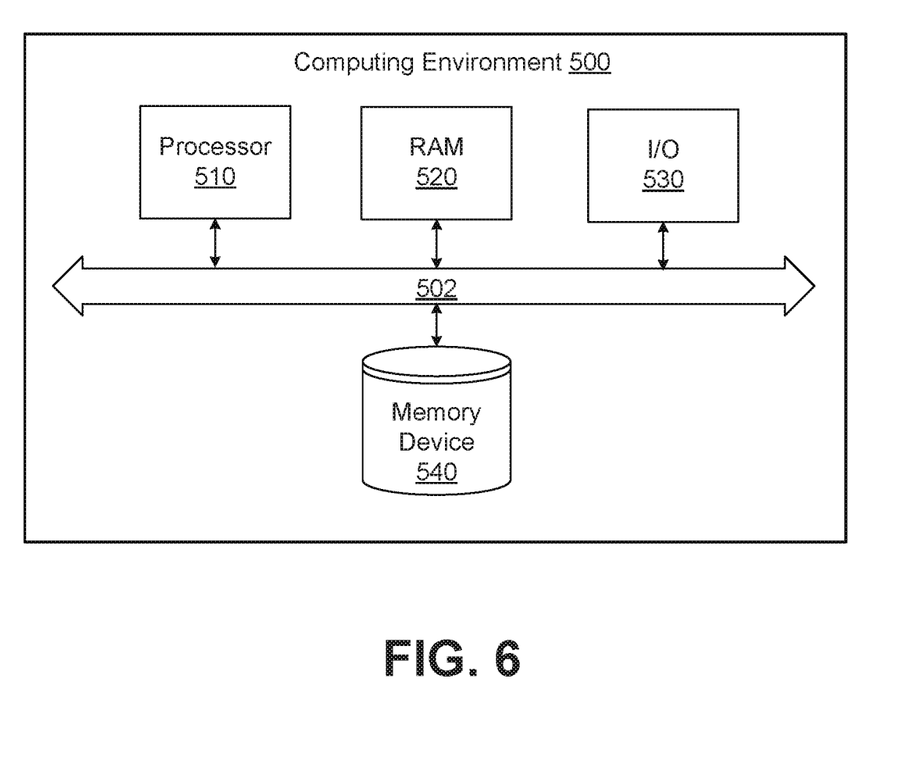
FIG. 6 is a schematic block diagram that provides one example illustration of a computing environment employed in the networked environment of FIG. 4, in accordance with various embodiments of the present disclosure.

With reference to FIG. 6, shown is a schematic block diagram of the computing environment 500 according to an embodiment of the present disclosure. The computing environment 500 includes one or more computing devices. Each computing device includes at least one processor circuit, for example, having a processor 510 and a memory 540, both of which are coupled to a local interface 502. To this end, each computing device can comprise, for example, at least one server computer or like device. The local interface 502 can comprise, for example, a data bus with an accompanying address/control bus or other bus structure as can be appreciated.

Stored in the memory 540 are both data and several components that are executable by the processor 510. In addition, an operating system can be stored in the memory 540 and executable by the processor 510. It is understood that there can be other applications that are stored in the memory 540 and are executable by the processor 510 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 540 and are executable by the processor 510. In this respect, the term "executable" means a program file that is in a form that can ultimately be run by the processor 510. Examples of executable programs include, for example, a compiled program that can be translated into machine code in a format that can be loaded into a random access portion of the memory 540 and run by the processor 510, source code that can be expressed in proper format such as object code that is capable of being loaded into a random access portion of the memory 540 and executed by the processor 510, or source code that can be interpreted by another executable program to generate instructions in a random access portion of the memory 540 to be executed by the processor 510, etc. An executable program can be stored in any portion or component of the memory 540 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 540 is defined herein as including both volatile and nonvolatile memory and data storage components. Volatile components are those that do not retain data values upon loss of power. Nonvolatile components are those that retain data upon a loss of power. Thus, the memory 540 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, the processor 510 can represent multiple processors 510 and/or multiple processor cores and the memory 540 can represent multiple memories 540 that operate in parallel processing circuits, respectively. In such a case, the local interface 502 can be an appropriate network that facilitates communication between any two of the multiple processors 510, between any processor 510 and any of the memories 540, or between any two of the memories 540, etc. The local interface 502 can comprise additional systems designed to coordinate this communication, including, for example, performing load balancing. The processor 510 can be of electrical or of some other available construction.

Although Vehicle Data System 101, Vehicle Control System 109, Mode Detection System 123, Network Communication Interface 126, Management Service 156, Application Service 159, Operator System 170, Management Service 176, and Application Service 179, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows the functionality and operation of an implementation of portions of the Operator System 170. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as a processor 510 in a computer system or other system. The machine code can be converted from the source code, etc. If embodied in hardware, each block may represent a circuit or a number of interconnected circuits to implement the specified logical function(s).

Although the flowchart of FIG. 5 shows a specific order of execution, it is understood that the order of execution can differ from that which is depicted. For example, the order of execution of two or more blocks can be scrambled relative to the order shown. Also, two or more blocks shown in succession in FIG. 5 can be executed concurrently or with partial concurrence. Further, in some embodiments, one or more of the blocks shown in FIG. 3 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including Vehicle Data System 101, Vehicle Control System 109, Mode Detection System 123, Network Communication Interface 126, Management Service 156, Application Service 159, Operator System 170, Management Service 176, and Application Service 179, that comprises software or code can be embodied in any non-transitory computer-readable medium for use by or in connection with an instruction execution system such as, for example, a processor 510 in a computer system or other system. In this sense, the logic can comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including Vehicle Data System 101, Vehicle Control System 109, Mode Detection System 123, Network Communication Interface 126, Management Service 156, Application Service 159, Operator System 170, Management Service 176, and Application Service 179, may be implemented and structured in a variety of ways. For example, one or more applications described can be implemented as modules or components of a single application. Further, one or more applications described herein may be executed in shared or separate computing devices or a combination thereof. For example, a plurality of the applications described herein can execute in the same computing device or in multiple computing devices in the same computing environment 500. Additionally, it is understood that terms such as "application," "service," "system," "engine," "module," and so on may be interchangeable and are not intended to be limiting.

The network 102 includes, for example, the Internet, intranets, extranets, wide area networks (WANs), local area networks (LANs), wired networks, wireless networks, or other suitable networks, etc., or any combination of two or more such networks. For example, such networks can comprise satellite networks, cable networks, Ethernet networks, and other types of networks.

The computing environment 500 can comprise, for example, a server computer or any other system providing computing capability. Alternatively, the computing environment 500 can employ a plurality of computing devices that can be arranged, for example, in one or more server banks or computer banks or other arrangements. Such computing devices can be located in a single installation or can be distributed among many different geographical locations. For example, the computing environment 500 can include a plurality of computing devices that together can comprise a hosted computing resource, a grid computing resource and/or any other distributed computing arrangement. In some cases, the computing environment 500 can correspond to an elastic computing resource where the allotted capacity of processing, network, storage, or other computing-related resources may vary over time.

Various applications and/or other functionality can be executed in the computing environment 500 according to various embodiments. Also, various data is stored in a data store 119, 163, and/or 173 that is accessible to the computing environment 500. The data store 119, 163, and/or 173 can be representative of a plurality of data stores 119, 163, and/or 173 respectively, as can be appreciated. The data stored in the data store 119, 163, and/or 173 for example, is associated with the operation of the various applications and/or functional entities described below.

The components executed on the computing environment 500, for example, include Vehicle Data System 101, Vehicle Control System 109, Mode Detection System 123, Network Communication Interface 126, Management Service 156, Application Service 159, Operator System 170, Management Service 176, and Application Service 179, and other applications, services, processes, systems, engines, or functionality not discussed in detail herein.

The client 185 is representative of a plurality of client devices that may be coupled to the network 102. The client 185 can comprise, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client 185 can include a display. The display can comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 185 can be configured to execute various applications such as a client application and/or other applications to access Application Service 156 and/or Application Service 179. The client application can be executed in a client 185 for example, to access network content served up by the computing environment 500 and/or other servers, thereby rendering a user interface on the display. To this end, the client application can comprise, for example, a browser, a dedicated application, etc., and the user interface can comprise a network page, an application screen, etc. The client 185 can be configured to execute applications beyond the client application such as, for example, email applications, social networking applications, word processors, spreadsheets, and/or other applications.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system for detecting human intervention over a driving operation of a vehicle, comprising:
   at least one vehicle sensor;
   at least one vehicle control system;
   at least one processor in communication with the at least one vehicle sensor and the at least one vehicle control system;
   at least one memory storing a plurality of instructions, which when executed by the at least one processor, cause the at least one processor to:
   collect vehicle driving operation data from the at least one vehicle sensor;
   store the collected vehicle driving operation data in a vehicle data store along with an indication whether the vehicle is at least operating in a first semi-autonomous or autonomous mode;
   transmit the collected data from the vehicle data store to a remote data store,
   determine, based on the collected vehicle driving operation data, a duration, nature and/or extent of a manual intervention event over the driving operation of the vehicle within a given period of time or over a given distance traveled by the vehicle; and
   determine, based on the collected vehicle driving operation data, a duration, nature and/or extent the driving of operation of the vehicle without manual intervention within the given period of time or over the given distance traveled by the vehicle, and
   compare the duration, nature and/or extent of the manual intervention event to the duration, nature and/or extent of the driving operation of the vehicle without manual intervention.

2. The system of claim 1, further comprising at least one computing device in communication with the remote data store.

3. The system of claim 1, wherein the plurality of instructions further cause the at least one processor to determine that the vehicle is not operating in the first semi-autonomous or autonomous mode and store the vehicle operation data in the vehicle data store along with an indication that the vehicle is not operating in the first semi-autonomous or autonomous mode.

4. The A system of claim 1, wherein the vehicle driving operation data includes data regarding human intervention with a semi-autonomous or autonomous driving operating system of the vehicle.

5. The system of claim 4, wherein the vehicle driving operation data includes one or more of the time of day of the initiation and termination of the human intervention, a time duration from the time of initiation of the human intervention to the time of termination of the human intervention, or the distance traveled by the vehicle from the time of initiation of the human intervention to the time of termination of the human intervention.

6. The system of claim 4, wherein the driving operating system of the vehicle is selected from the group consisting of systems for the steering, direction, acceleration, speed, braking, cruise control, accident or collision avoidance, lane departure, seat belts, and any combination thereof.

7. The system of claim 4, wherein the vehicle driving operation data includes data regarding one or more of a vehicle location or area of travel, a road condition, a road area speed limit, a weather report or condition, or road area event.

8. The A system of claim 1, wherein the at least one computing device comprises a memory storing instructions, which when executed by the at least one computing device, cause the at least one computing device to determine a ratio of duration the vehicle was operated in the first semi-autonomous or autonomous mode to a total duration during which the vehicle was operated.

9. A method of detecting human intervention over a driving operation of a vehicle during a given period of time or over a given distance traveled by the vehicle, the vehicle including a vehicle monitoring system, comprising:
  obtaining data from the vehicle monitoring system;
  determining an occurrence of a manual intervention event over a driving operation of the vehicle;
  determining a duration, nature and/or extent of the manual intervention event within the given period of time or over the given distance traveled by the vehicle; and
  determining a duration, nature and/or extent the driving of operation of the vehicle without manual intervention within the given period of time or over the given distance traveled by the vehicle,
  wherein the duration, nature and/or extent of the manual intervention event is compared to the duration, nature and/or extent of the driving operation of the vehicle without manual intervention.

10. The method of claim 9, further including determining insurance coverage based thereon.

11. The A method of claim 9, wherein the data from the vehicle monitoring system is vehicle driving operation data that includes data regarding the manual intervention with a semi-autonomous or autonomous driving operating system of the vehicle.

12. The method of claim 11, wherein the vehicle driving operation data includes one or more of the time of day of the initiation and termination of the manual intervention, a time duration from the time of initiation of the manual intervention to the time of termination of the manual intervention, or the distance traveled by the vehicle from the time of initiation of the manual intervention to the time of termination of the manual intervention.

13. The method of claim 11, wherein the driving operating system of the vehicle is selected from the group consisting of systems for the steering, direction, acceleration, speed, braking, cruise control, accident or collision avoidance, lane departure, seat belts, and any combination thereof.

14. The method of claim 11, wherein the vehicle driving operation data includes data regarding one or more of a vehicle location or area of travel, a road condition, a road area speed limit, a weather report or condition, or road area event.

15. A non-transitory computer readable medium embodying a program that, when executed in at least one computing device, causes the at least one computing device to at least determine a human intervention over a driving operation of a vehicle during a given period of time or over a given distance traveled by the vehicle, the vehicle including a vehicle monitoring system, by:
  obtaining data from the vehicle monitoring system;
  determining an occurrence of a manual intervention event over a driving operation of the vehicle;
  determining a duration, nature and/or extent of the manual intervention event within the given period of time or over the given distance traveled by the vehicle; and
  determining a duration, nature and/or extent the driving of operation of the vehicle without manual intervention within the given period of time or over the given distance traveled by the vehicle,
  wherein the duration, nature and/or extent of the manual intervention event is compared to the duration, nature and/or extent of the driving operation of the vehicle without manual intervention.

16. The non-transitory computer readable medium of claim 15, further including determining insurance coverage based thereon.

17. The non-transitory computer readable medium of claim 15, wherein the data from the vehicle monitoring system is vehicle driving operation data that includes data regarding the manual intervention with a semi-autonomous or an autonomous driving operating system of the vehicle.

18. The non-transitory computer readable medium of claim 17, wherein the vehicle driving operation data includes one or more of the time of day of the initiation and termination of the manual intervention, a time duration from the time of initiation of the manual intervention to the time of termination of the manual intervention, or the distance traveled by the vehicle from the time of initiation of the manual intervention to the time of termination of the manual intervention.

19. The non-transitory computer readable medium of claim 17, wherein the driving operating system of the vehicle is selected from the group consisting of systems for the steering, direction, acceleration, speed, braking, cruise control, accident or collision avoidance, lane departure, seat belts, and any combination thereof.

20. The non-transitory computer readable medium of claim 18, wherein the vehicle driving operation data includes data regarding one or more of a vehicle location or area of travel, a road condition, a road area speed limit, a weather report or condition, or road area event.

* * * * *